(12) United States Patent
Casamassima et al.

(10) Patent No.: US 10,440,576 B1
(45) Date of Patent: Oct. 8, 2019

(54) SYSTEM FOR SECURING KEYLESS ENTRY SYSTEMS

(71) Applicant: NXP B.V., Eindhoven (NL)

(72) Inventors: Filippo Casamassima, Graz (AT); Wolfgang Eber, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/109,956

(22) Filed: Aug. 23, 2018

(51) Int. Cl.
*H04W 4/40* (2018.01)
*H04W 12/08* (2009.01)
*H04B 17/318* (2015.01)
*H04W 52/02* (2009.01)
*H04W 4/80* (2018.01)

(52) U.S. Cl.
CPC .......... *H04W 12/08* (2013.01); *H04B 17/318* (2015.01); *H04W 4/80* (2018.02); *H04W 52/0229* (2013.01)

(58) Field of Classification Search
CPC ................................ H04W 12/08; H04W 4/80
See application file for complete search history.

(56) References Cited

U.S. PATENT DOCUMENTS

2015/0018702 A1* 1/2015 Galloway .............. A61B 5/044
600/523
2016/0225203 A1* 8/2016 Asmar ................ G07C 9/00309
2016/0313364 A1* 10/2016 Kawai .................... G01P 11/00
2017/0249794 A1* 8/2017 Davis .................. H04L 63/0861
2019/0104473 A1* 4/2019 Chun ................ H04W 52/0235

FOREIGN PATENT DOCUMENTS

| CN | 107124696 A | 9/2017 |
|---|---|---|
| DE | 102010061111 A1 | 6/2012 |
| EP | 2656323 A2 | 10/2013 |
| WO | 2012097787 A2 | 7/2012 |
| WO | 2017133943 A1 | 8/2017 |

OTHER PUBLICATIONS

Lin, J. et al. "On the potential of bluetooth low energy technology for vehicular applications", IEEE Communications Magazine, vol. 53, No. 1, pp. 267-275 (Jan. 2015).

* cited by examiner

*Primary Examiner* — Tuan H Nguyen
(74) *Attorney, Agent, or Firm* — Rajeev Madnawat

(57) ABSTRACT

A system for performing an operation in a vehicle is disclosed. The system includes a Bluetooth Low Energy (BLE) module, a microcontroller coupled to the BLE module and a transmitter/receiver coupled to the microcontroller. The microcontroller is configured to transmit a wakeup signal at preselected intervals to wake up an electronic key and measure received low frequency (LF) signal strength and Bluetooth signal strength transmitted from the electronic key and based on measured signal strengths determine if the electronic key is approaching the vehicle and to perform a preselected vehicle operation on the vehicle.

10 Claims, 3 Drawing Sheets

SYSTEM FOR SECURING KEYLESS ENTRY SYSTEMS

BACKGROUND

Passive keyless entry (PKE) is an automotive security system that operates automatically when the user of a vehicle is in proximity to the vehicle, unlocking the door on approach or when the door handle is pulled and locking it when the user walks away or touches the car on exit. The vehicle may also be started by the user when the PKE system is detected inside of the vehicle. PKE systems may also be used to secure buildings or areas of buildings.

PKE System for car access rely on wireless technology for the communication between the vehicle and the key device (Key device can be a key-fob, a smartphone or any other portable radio enabled device).

Remote keyless entry (RKE) is an electronic access system that can be controlled from a distance. RKEs, which are typically used to remotely lock or unlock doors, require the end user to initiate an action that will cause a physical or software key fob to transmit a radio signal to a receiver that controls an electronic lock. Typically, the action is to press a button on a physical fob or mobile app.

Traditional key fob uses low frequency communication with the associated vehicle and operations can be performed through a key fob if it is determined, via received signal strength, that the key fob is in a close proximity to the vehicle. However, it is not difficult to use a relay attack to make it appear that the key fob is in close proximity even though it is not.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system for performing an operation in a vehicle is disclosed. The system includes a Bluetooth Low Energy (BLE) module, a microcontroller coupled to the BLE module and a transmitter/receiver coupled to the microcontroller. The microcontroller is configured to transmit a wakeup signal at preselected intervals to wake up an electronic key and measure received low frequency (LF) signal strength and Bluetooth signal strength transmitted from the electronic key and based on measured signal strengths determine if the electronic key is approaching the vehicle and to perform a preselected vehicle operation on the vehicle. The preselected vehicle operation includes at least one of opening a door, turning on lights, displaying welcome message and starting engine.

The wakeup signal is sent via the LF transmitter/receiver and the microcontroller is configured to continuously send the wakeup signal at a preselected interval. Signals received by the BLE module are filtered to remove high frequency noise. The electronic key includes a key microcontroller and a key BLE module and the key microcontroller is configured to wake up the key BLE module upon receiving the wakeup signal. The key BLE module is configured to start advertising process after waking up.

A Savitzky-Golay filter or Kalman filter may be used to remove the high frequency noise.

In some examples, the BLE module is coupled to a plurality of antennas and the microcontroller is configured to select a highest strength signal from the plurality of antennas.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

Passive keyless entry (PKE) system provides a convenience and apparently better security because unlike old type lock and ignition keys, PKE key fob may not be duplicated. The car and the key fob communicate with each other using a combination of both Low Frequency and Ultra High Frequency radio signals. The door lock and unlock functions, as well as the engine start functions, are activated by the proximity of the key fob to the car. When the key is brought close to the car, it issues a command to open the car and turn on the ignition. However, it has been found that an intruder may use a simple device to capture signals from the car and relaying them to the key fob, thus making it appear that the key fob is closer proximity of the vehicle than it actually is, and causing the doors to be unlocked, for example.

The embodiments described herein uses measuring distance and activity pattern using both low frequency (LF) and Bluetooth Low Energy (BLE) to provide better security to the PKE system.

Figure 1:
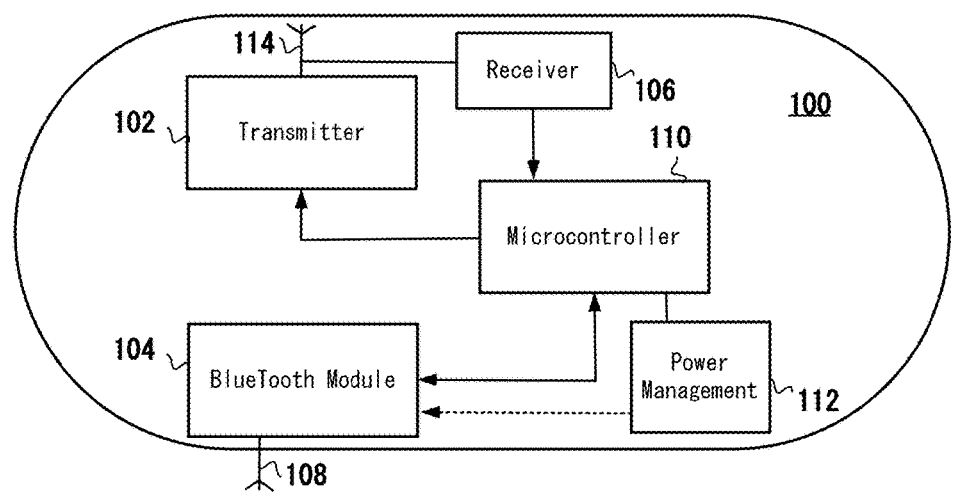
FIG. 1 shows a block diagram of an electronic key in accordance with one or more embodiments.

FIG. 1 shows a block diagram of an electronic or PKE key fob 100. Not that not all components of a key fob are shown in FIG. 1 in that well known components have been omitted so as not to obfuscate the present disclosure. The key fob 100 includes a Bluetooth Low Energy module (BLE) 104 for sending and receiving Bluetooth signals. The BLE module 104 is coupled to an internal BLE antenna 108. The key fob 100 also includes a transmitter 102 along with an antenna 114 to transmit signals to the vehicle associated with the key fob 100. Note that even though the term "vehicle" is being used in the description, the embodiments described herein may also be used for other systems, such as operating a building door through the key fob 100. A programmable microcontroller 110 is also included. The microcontroller 110 may include internal or external memory. A power management module 112 is provided to power on, off or to put in sleep mode various components such as a radio of the transmitter 102, the BLE module 104 and the microcontroller 110. The key fob 100 may also include a receiver 116 to receive signals from the vehicle. In some embodiments, the transmitter 102 and the receiver 106 uses low frequency (LF) signals for transmission and reception of signals.

Figure 2:
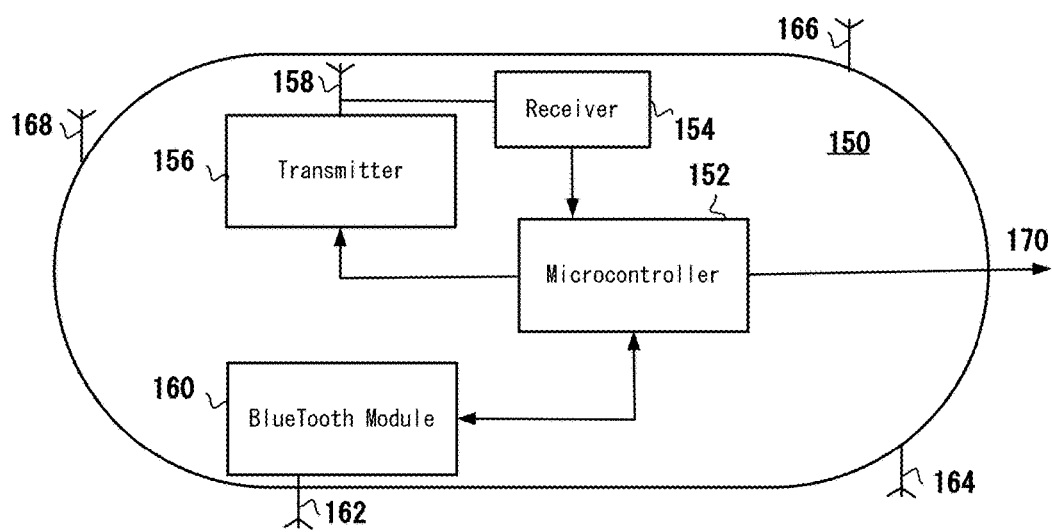
FIG. 2 shows a block diagram of electronic modules in a vehicle for communicating with the electronic key in accordance with one or more embodiments.

FIG. 2 illustrate a communication and processing system 150 embodied in a vehicle. The communication and processing system 150 includes a transmitter 156 coupled with an antenna 158 and a receiver 154 for receiving LF signals from the key fob 100. The communication and processing system 150 also includes a BLE module 160. The communication and processing system 150 also includes a microcontroller 152 for processing signals received from the receiver 154 and the BLE module 160. In some embodiments, the BLE module 160 may be coupled to a plurality of antennas 162, 164, 166, 168 installed at different locations in the vehicle. However, in some other embodiments, one antenna 162 may be sufficient. The communication and processing system 150 also includes a control port 170 that is configured to be coupled to the electronic control system of the vehicle.

Figure 3:
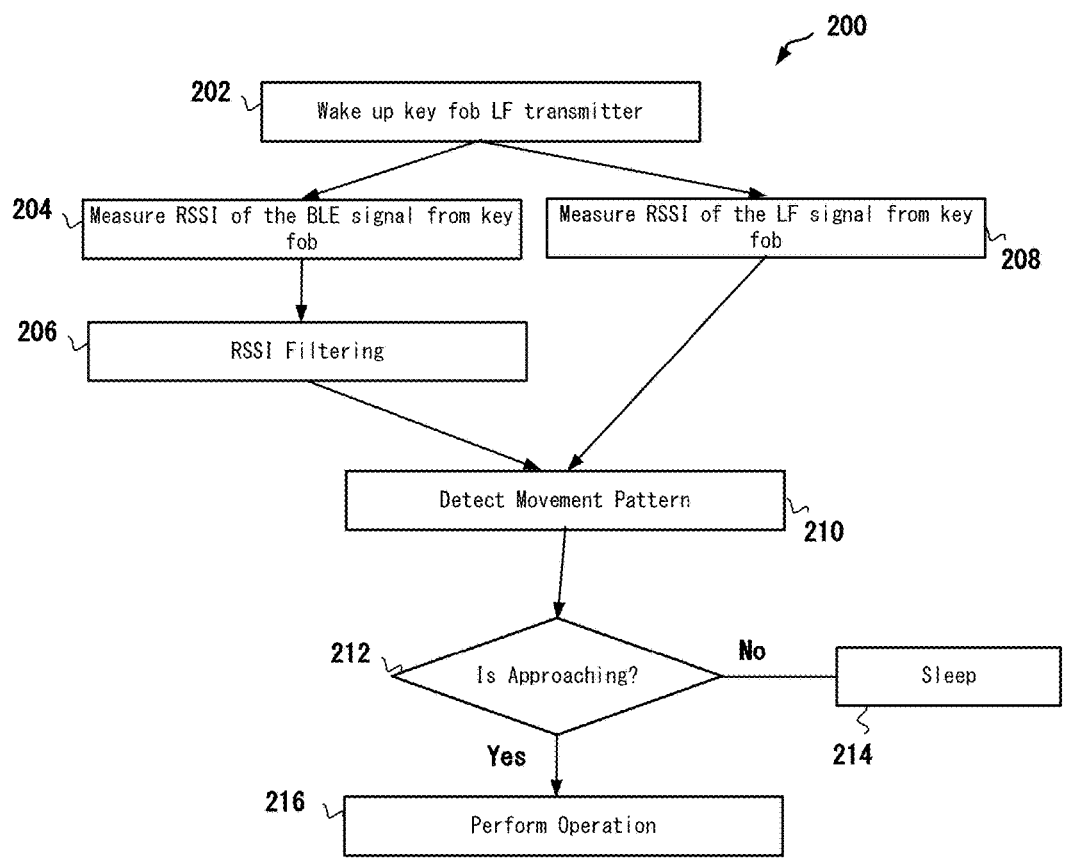
FIG. 3 shows a process of communicating with the electronic key and performing operations in a vehicle in accordance with one or more embodiments.

FIG. 3 illustrates a process 200 of communicating with the key fob 100 and performing operations in a vehicle by the communication and processing system 150. The microcontroller 152 is configured and programmed to execute the steps of the process 200. Accordingly, at step 202, the communication and processing system 150 sends a wake up signal via the transmitter 156. If the key fob 100 is within the communication range, upon receiving the wakeup signal, the transmitter 102 is put in an active state. The BLE module 104 is also woken up. Both the transmitter 102 and the BLE module 104 start to transmit signals. At step 208, the receiver 154 receives the signals transmitted by the transmitter 102 and measures received signal strength (e.g., RSSI). Based on the strength of the received signal, the microcontroller 152 determines a distance between the communication and processing system 150 and the key fob 100. If the distance with less than a preselected threshold, at step 204, the BLE module 160 receives the BLE signals transmitted by the BLE module 104 and the microcontroller 152 measures the distance using the received signal strength. In some embodiments, where there are more than one antennas coupled to the BLE module 160, the microcontroller 152 selects the antenna that is providing stronger signals. At step 206, RSSI data from BLE may be filtered to remove noise. Noise filters such as Savitzky-Golay or Kalman Filter may be used to filter noise from the BLE data. It may be noted that the operation of step 202 may be repeated at preselected intervals.

Steps 204 and 208 are repeated for a preselected time, to enable, at step 210, the microcontroller 152 to make a determination of a movement pattern of the key fob 100. At decision step 212, if the microcontroller 152 determines, based on signal strengths, that the distance between the communication and processing system 150 and the key fob 100 is decreasing overtime and when the distance is within a second preselected distance, at step 216, the microcontroller 152 sends a command to the vehicle control system via the control port 170 to perform a preselected operation. The preselected operation may be configurable and may include opening the doors, starting the engine, glowing welcome light, turning on headlights, etc. More than one operations may be configured to be executed. If at step 212, if the microcontroller 152 determines that the distance is increasing, the microcontroller 152 causes a sleep signal to be sent to the key fob 100.

Figure 4:
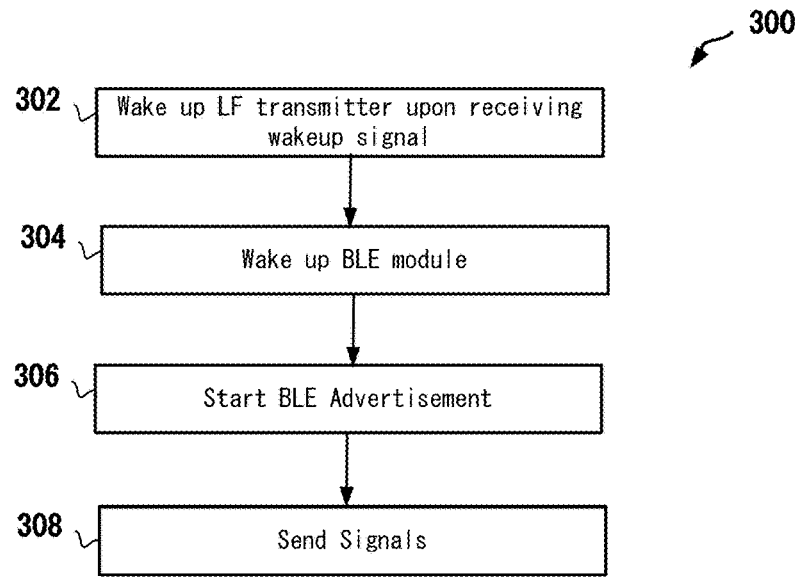
FIG. 4 shows a process performed at the electronic key upon receiving a wake up signal from the vehicle in accordance with one or more embodiments.

FIG. 4 illustrates a process 300 performed at the key fob 100 upon receiving a wake up signal from the communication and processing system 150, as described above. Accordingly, at step 302 the transmitter 102 is woken up and at step 304, the BLE module 104 is woken up. At step 306, the BLE module 104 may advertise. BLE has two ways of communicating. The first one is using advertisements, where a BLE peripheral device broadcasts packets to every device around it. The receiving device can then act on this information or connect to receive more information. The second way to communicate is to receive packets using a connection, where both the peripheral and central send packets. BLE advertising causes the receiver devices to wake up and establish connection with a transmitting device. At step 308, the transmitter 102 and the BLE module 104 start to transmit signals.

Figure 5:
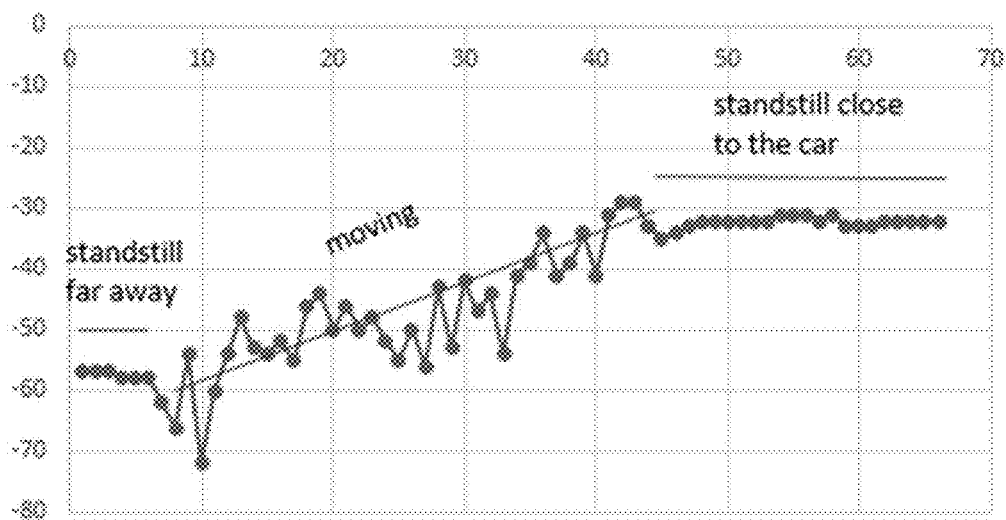
FIG. 5 is a sample graph to illustrate variations in received signal strength according to activity and distance of the electronic key from the vehicle.

FIG. 5 shows an example of using RSSI to determine activities and movement of the key fob 100 by the microcontroller 152. As depicted in the example illustrated in FIG. 5, during a movement toward the vehicle, RSSI fluctuates and increases (a user carrying the key fob 100 may be walking). When the key fob 100 is in close proximity and is standstill, the RSSI becomes relatively constant and higher than previous readings.

The embodiments described above provide various advantages. For example, a relay attack may be thwarted because the embodiments herein use both LF and BLE signals for calculating distance. Therefore, a relay attack using LF signals, which is a common attack mechanism, can be prevented. Further, the embodiments described herein also determines if the key fob is approaching the vehicle and within a preselected physical proximity, thus preventing a relay attack via a stationary relay attack antenna.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for performing an operation in a vehicle, comprising:
   a Bluetooth Low Energy (BLE) module;
   a microcontroller coupled to the BLE module;
   a low frequency (LF) transmitter/receiver coupled to the microcontroller; and
   wherein the microcontroller is configured to transmit a wakeup signal at preselected intervals to wake up an electronic key and measure received low frequency (LF) signal strength and Bluetooth signal strength transmitted from the electronic key and based on measured signal strengths determine if the electronic key is approaching the vehicle and to perform a preselected vehicle operation on the vehicle.

2. The system of claim 1, wherein the wakeup signal is sent via the LF transmitter/receiver.

3. The system of claim 1, wherein the microcontroller is configured to continuously send the wakeup signal at a preselected interval.

4. The system of claim 1, wherein signals received by the BLE module are filtered to remove high frequency noise.

5. The system of claim 4, wherein a Savitzky-Golay filter is used to remove the high frequency noise.

6. The system of claim 4, wherein a Kalman filter is used to remove the high frequency noise.

7. The system of claim 1, wherein the electronic key includes a key microcontroller and a key BLE module, wherein the key microcontroller is configured to wake up the key BLE module upon receiving the wakeup signal.

8. The system of claim 7, wherein the key BLE module is configured to start advertising process after waking up.

9. The system of claim 1, wherein the BLE module is coupled to a plurality of antennas and the microcontroller is configured to select a highest strength signal from the plurality of antennas.

10. The system of claim 1, wherein the preselected vehicle operation includes at least one of opening a door, turning on lights, displaying welcome message and starting engine.

* * * * *